United States Patent [19]

Nohira et al.

[11] 4,005,576

[45] Feb. 1, 1977

[54] INTERNAL COMBUSTION ENGINE EXHAUST MANIFOLD WITH CYLINDRICAL BUILT-IN CATALYST CONTAINER

[75] Inventors: Hidetaka Nohira; Hironori Bessho; Yasuyuki Sakai, all of Susono, Japan

[73] Assignee: Toyota Jidosha Kogyo Kabushiki Kaisha, Japan

[22] Filed: Apr. 18, 1975

[21] Appl. No.: 569,558

[30] Foreign Application Priority Data

Jan. 20, 1975 Japan ................................ 50-8976

[52] U.S. Cl. ............................... 60/302; 23/288 F
[51] Int. Cl.² ........................................... F01N 3/15
[58] Field of Search ............ 60/282, 302, 299, 304, 60/305; 23/288 FR

[56] References Cited

UNITED STATES PATENTS

| | | | |
|---|---|---|---|
| 3,247,666 | 4/1966 | Behrens | 60/292 |
| 3,594,131 | 7/1971 | Palma | 23/288 FR |
| 3,644,098 | 2/1972 | Palma | 23/288 FR |
| 3,685,972 | 8/1972 | Palma | 23/288 FR |
| 3,853,483 | 12/1974 | Cross | 23/288 FR |
| 3,902,853 | 9/1975 | Marsee | 23/288 FR |
| 3,968,645 | 7/1976 | Noguchi | 60/302 |

FOREIGN PATENTS OR APPLICATIONS 1,292,146 4/1969 Germany ............................ 60/301

*Primary Examiner*—Douglas Hart
*Attorney, Agent, or Firm*—Stevens, Davis, Miller & Mosher

[57] ABSTRACT

An internal combustion engine exhaust manifold with cylindrical built-in catalyst container which comprises cylindrical inner and outer cylinders and annular lids fitting at opposite ends thereof and is filled with a catalyst suitable for cleaning the engine exhaust.

An exhaust gas cleaning device using the exhaust manifold comprises an oxygen concentration sensor located in the exhaust gas flow and an electronic fuel injector for performing feedback control in accordance with a signal from the oxygen concentration sensor.

1 Claim, 9 Drawing Figures

INTERNAL COMBUSTION ENGINE EXHAUST MANIFOLD WITH CYLINDRICAL BUILT-IN CATALYST CONTAINER

BACKGROUND OF THE INVENTION

1. Field of Invention

This invention relates to an exhaust gas cleaner, and more particularly to a catalyst container built in an exhaust manifold of an internal combustion engine of a motor vehicle.

2. Description of Prior Art

It is known in the art to pass the engine exhausts of motor vehicles through a catalyst container for cleaning out the three noxious components of the engine exhausts, HC, CO and $NO_x$, simultaneously by thermal chemical reactions. In such a case, the catalyst container is preferred to be mounted in the vicinity of the exhaust manifold of the engine, as the exhaust gas is subjected to the thermal chemical reactions in the presence of the catalyst immediately after its generation and while it is still at a high temperature level, requiring a smaller amount of catalyst to attain a high cleaning efficiency than in a case where the catalyst container is mounted in a position remote from the exhaust manifold of the engine. However, the conventional internal engines usually have the catalyst container mounted in a position contiguous to the muffler which lies remote from the exhaust manifold of the engine, with the result that the catalyst can clean the exhaust gas only in a low efficiency.

SUMMARY OF THE INVENTION

It is therefore the object of the present invention to provide an exhaust gas cleaner of a novel construction which has a cylindrical catalyst container built in the exhaust manifold of the engine to eliminate the difficulty of the aforementioned conventional counterparts.

It is another object of the present invention to provide a novel exhaust gas cleaning device which has a cylindrical catalyst container built in an exhaust manifold of the engine and filled with a catalyst which is capable of treating the three noxious engine exhaust components of HC, CO and $NO_x$ simultaneously in the vicinity of the stoichimetrical mixture ratio, an oxygen concentration sensor located in the exhaust gas flow immediately downstream of the exhaust manifold, and an electronic fuel injector including a computer and capable of performing feedback control in accordance with a signal from the oxygen concentration sensor to feed the fuel to the intake system of the engine automatically in the stoichimetrical air-fuel ratio.

It is still another object of the present invention to provide a novel exhaust gas cleaning device which has a cylindrical catalyst container with a radial differential of 20 to 30 mm in order to accelerate oxidation reactions in normal operating conditions and at the same time to prevent the catalyst container from being damaged by abrupt and intense reactions of unburned gases at the catalyst bed due to misfire of the ignition system, and a secondary air pump which is adapted to inject air toward the engine exhaust port or upstream of the catalyst container while the engine is in operation.

It is a further object of the present invention to provide a gas cleaning device of novel construction, including a cylindrical catalyst container which has the catalyst filled in a space between an inner cylinder and an outer cylinder, the inner and outer cylinders being connected at opposite ends by annular end plates which have no perforations and having a lower wall portion containing a multiple number of perforations and an upper wall portion with no perforations.

It is a still further object of the present invention to provide a novel gas cleaning device wherein the exhaust manifold of the internal combustion engine comprises upper and lower casings, a liner of heat resistant steel material positioned inwardly of and at a space from the upper and lower casings, and a cylindrical catalyst container replaceably mounted through the liner and having a lid member to be fit in said upper casing and an outlet end positioned in registration with the outlet of the exhaust manifold.

The above and other objects of the present invention will become clear from the following description of the embodiment according to the present invention.

The invention will now be illustrated more particularly in conjunction with preferred embodiments which are shown in the accompanying drawings.

DETAILED DESCRIPTION OF THE PREFERRED EMBODIMENT

Figure 1:
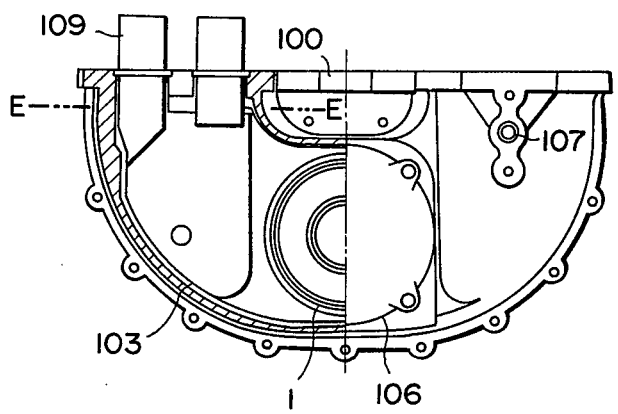
FIG. 1 is a partially horizontally sectioned plan view showing an embodiment of the present invention.
Figure 2:
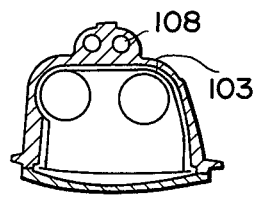
FIG. 2 is a sectional view taken along line E — E of FIG. 1.

Referring to FIGS. 1 and 2, an internal combustion engine exhaust manifold 100 is divided into an upper casing 101 and a lower casing 102 and provided with a thin heat shielding liner 103 of heat resistant steel material covering the inner wall surfaces of the upper and lower casings at a suitable distance therefrom. The exhaust manifold 100 thus has double wall construction by the provision of the upper and lower casings 101 and 102 and the heat shielding liner 103. Furthermore, a catalyst container 1 is built in the casings.

Figure 5:
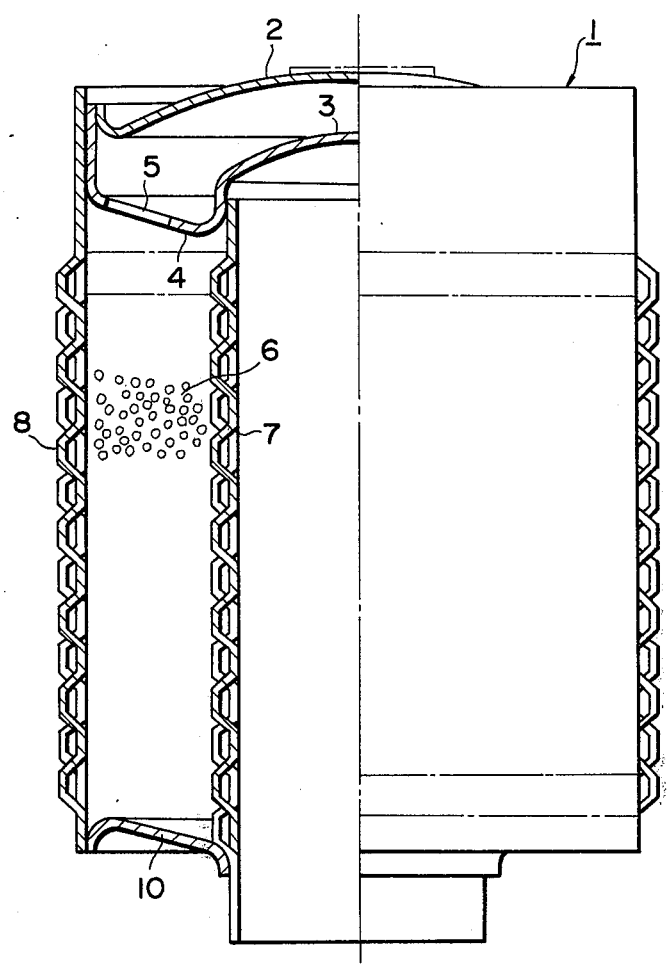
FIG. 5 is a partially sectioned front view of the cylindrical catalyst container according to the present invention.
Figure 6:
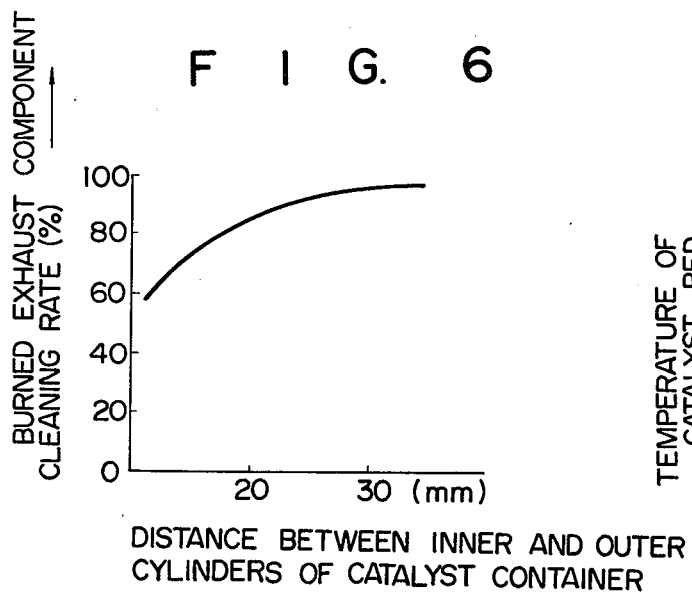
FIG. 6 is a graphic representation of the burned exhaust component cleaning rate relative to the distance between the inner and outer cylinders of the cylindrical catalyst container.

The catalyst container 1, which is illustrated in greater detail in FIG. 5, has supplementary granular catalyst stored in a space which is defined by an outer cylinder lid 2, an inner cylinder lid 3 and an upper annular lid 4. The catalyst 6 is filled in an annular space between the porous or perforated inner and outer cylinders 7 and 8 which are formed from a louver plate or the like. As the catalyst loses its volume as a result of the catalytic action, the supplementary catalyst is replenished through a number of small apertures 5 which are bored through the annular lid member 4. The annular space between the inner and outer cylinders 7 and 8 which is filled with the catalyst has its bottom end closed by a lower annular lid member 10. The inner and outer cylinders 7 and 8 are spaced from each other in the radial direction by a distance of 20 mm to 30 mm in order to prevent the catalyst container from being attacked by intense reaction of unburned gases at the catalyst bed due to misfire of the ignition system and at the same time to prevent melting losses of the catalyst. In this connection, FIG. 6 shows a graph of the effective distance between the inner and outer cylinders in relation with the unburned components cleaning rate. The inner and outer cylinders 7 and 8 each have a non-perforated upper wall portion over a distance of several tens of millimeters from the upper end contiguous to the upper annular lid member 4, and a perforated lower wall portion containing a multiple number of perforations and extending downwardly from the upper wall portion to the lower annular lid member 10 so that the exhaust gases are brought into contact for reaction with the catalyst 6 through the perforations in the outer cylinder 8 and cleaned while being discharged into the inner hollow space of the inner cylinder through the perforations thereof. As mentioned hereinbefore, the inner and outer cylinders have an upper wall portion which has no pores or perforations. This is because otherwise non-reacted exhaust gases would escape through a void space over the catalyst between the inner and outer cylinders when the catalyst has lost its volume to a certain extent.

Figure 3:
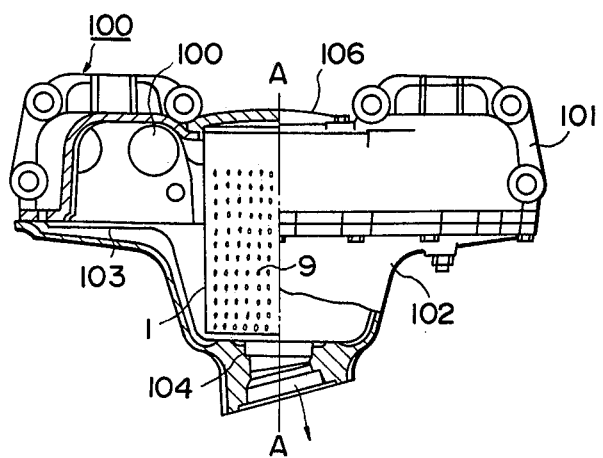
FIG. 3 is a partially vertically sectioned front view in the embodiment shown in FIG. 1.
Figure 4:
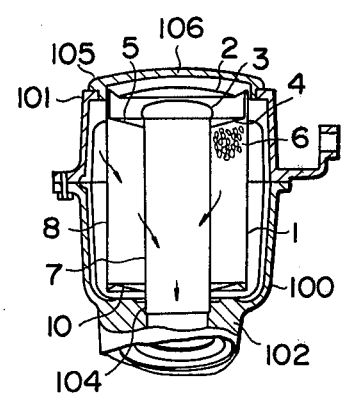
FIG. 4 is a sectional view taken along line A — A of FIG. 3.

Referring to FIGS. 3 and 4, the lower end of the catalyst container 1 is slidably or fixedly fitted in a flange 104 at the outlet end of the exhaust manifold, while the circular lid 106 is mounted in position with a gap space 105 to make up for the thermal expansion. The circular lid 106 is slidably fitted on the wall surface of the manifold and removable for the replacement of the catalyst container 1. In order to accelerate the oxidation reactions for cleaning out the noxious exhaust gas components such as HC and CO, secondary air is fed from a secondary air pump 200 which is separately mounted on the engine, through a secondary air injection port 107 and passage 108 which are provided on the upper casing 101, and injected toward the exhaust port 110 of the engine or upstream of the catalyst container 1. The exhaust port 110 is interiorly provided with a port liner 109 through which the exhaust gases from the engine are discharged into a heat insulating liner 103 within the exhaust manifold 100.

Figure 8:
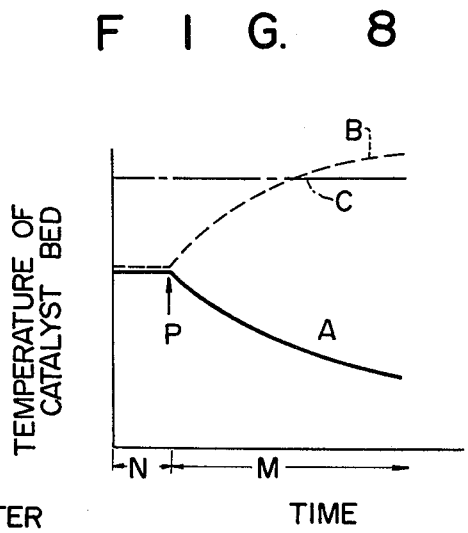
FIG. 8 is a graphical illustration showing the temperature of the catalyst bed in relation with the injection of secondary air.
Figure 7:
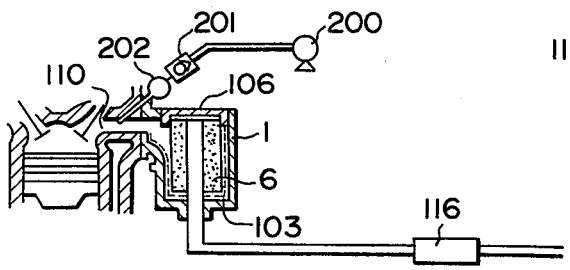
FIG. 7 is a diagrammatic view showing another embodiment of the present invention.

FIG. 7 is a diagrammatic view showing another embodiment of the present invention, where the cylindrical catalyst container 1 is filled with an oxidation catalyst 6' which serves mainly for cleaning out noxious exhaust gas components such as HC and CO. The construction of the catalyst container 1 and the connection of the catalyst container 1 to the exhaust manifold reactor are same as in the preceding embodiment. In order to accelerate the oxidation reactions in the normal operating conditions of the engine and at the same time to prevent the catalyst container 1 and the catalyst 6 being attacked by abrupt reactions of unburned gases which might occur at the catalyst bed due to misfire of the ignition system, the inner and outer cylinders 7 and 8 of the cylindrical catalyst container are constructed to have a radial differential of 20 mm to 30 mm while secondary air is fed through a check valve 202 from a secondary air pump 200 which is mounted on the engine for injecting secondary air through an air injection tube toward the engine exhaust port 110 or upstream of the catalyst container 1 when the engine is in operation. FIG. 8 is a graphic representation of the timewise temperature variations of the catalyst beds with and without the injection of the secondary air, where the solid line A is a plot as obtained by injection of the secondary air, the broken like B is a plot as obtained without the secondary air injection, and the dot-and-dash like indicates a critical durable temperature level of the catalyst container 1. Both the lines A and B maintain a constant temperature level while the engine is in normal operating conditions. However, in the case where the secondary air is not injected, the temperature of the catalyst bed is raised beyond the critical level C should any one of the engine cylinders misfire, as shown at B. In contrast, the injection of the secondary air contributes to lower the temperature of the catalyst bed to a safe level as indicated at A.

Figure 9:
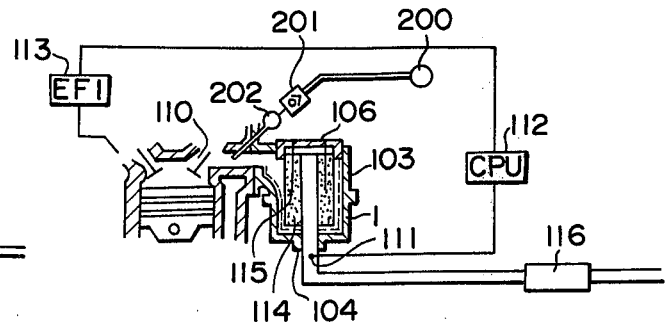
FIG. 9 is a diagrammatic view showing still another embodiment of the invention.

FIG. 9 is a diagrammatic view showing still another embodiment of the invention, which employs an electronic fuel injection system. The catalyst container 1 is filled with a catalyst 114 which is capable of reducing the three noxious exhaust components of HC, CO and $NO_x$ simultaneously in the vicinity of the stoichimetrical mixture ratio. On the other hand, an oxygen concentration sensor 111 is mounted downstream of the flange portion 104 at the outlet end of the exhaust manifold. The output signals of the oxygen concentration sensor 111 is fed to a computer 112 for the feedback control to supply the fuel to the intake system of the engine automatically in a stoichimetrical mixture ratio from the electronic fuel injector 113. In the stoichimetrical mixture ratio, the noxious unburned gas components which are discharged through the exhaust port 110 undergo the oxidation and reduction reactions in the presence of the catalyst 114 which is effective for all of the three noxious components. As a result, HC and CO are oxidized while $NO_x$ is reduced into a harmless form. Further, the catalyst container 1 is interiorly provided with a temperature sensor 115 which is adapted to detect abnormal or destructive conditions which might occur at the catalyst bed as a result of abrupt thermal reactions under abnormal engine operating conditions. Upon detection of such conditions, secondary air is injected toward the exhaust port 110 or upstream of the catalyst container 1 from a secondary air injection pump 200 through a check valve 201 and a secondary air injection tube 202, thereby enhancing the reliability of the system. The reference numeral 116 denotes a muffler.

According to the present invention, the exhaust manifold of the engine has a built-in catalyst container for cleaning the engine exhausts, so that it becomes possible to attain a higher exhaust gas cleaning efficiency with a smaller amount of catalyst. Moreover, as the secondary air pump is provided on the engine to inject air toward the engine exhaust port or upstream of the catalyst container in normal or desired operating conditions of the engine, the exhaust gas cleaning oxidation reactions are accelerated, while preventing the damages of the catalyst container or loss of the catalyst which would otherwise be caused by misfiring of the engine.

It will be understood that the above description is merely illustrative of preferred embodiments of the invention.

What is claimed is:

1. An internal combustion engine exhaust manifold having a built-in catalyst container of a cylindrical shape, wherein said exhaust manifold comprises:

upper and lower casings, a heat shielding liner of heat resistant material provided inwardly of and spaced from said upper and lower casings, and an air injection port provided within said exhaust manifold at a position adjacent a cylindrical catalyst container for injecting secondary air thereto during operation of an engine, said secondary air being fed from a secondary air pump which is separately mounted on said engine, said cylindrical catalyst container being filled with a catalyst suitable for cleaning the engine exhaust, and comprising concentric inner and outer cylinders having a radius differential of 20 to 30 mm., and annular lids fitting at opposite ends of said inner and outer cylinders to define therebetween an annular volume filled with said catalyst, said inner and outer cylinders having an upper wall portion with no perforations over a predetermined distance from the upper ends thereof and a lower wall portion containing multiple perforations which extend contiguously from said upper wall portion down to the lower ends of the cylinders such that the engine exhaust gas is introduced into said annular volume through perforations in said outer cylinder to undergo the cleaning reactions and then is discharged to the outlet of said exhaust manifold through the perforations in the inner cylinder of said cylindrical catalyst container, the cylindrical catalyst container being replaceably mounted through said heat shielding liner and having in the upper portion thereof a cover member to be fitted in said upper casing and a lower portion disposed in alignment with the outlet of said exhaust manifold.

* * * * *